(12) United States Patent
King, Jr.

(10) Patent No.: US 7,960,869 B2
(45) Date of Patent: Jun. 14, 2011

(54) INTERNAL INTELLIGENCE FOR REMOTE OPERATED RELAY

(75) Inventor: William A King, Jr., Loganville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 1222 days.

(21) Appl. No.: 11/635,233

(22) Filed: Dec. 7, 2006

(65) Prior Publication Data

US 2008/0084644 A1    Apr. 10, 2008

Related U.S. Application Data

(60) Provisional application No. 60/826,643, filed on Sep. 22, 2006.

(51) Int. Cl.
*H01H 9/54* (2006.01)
(52) U.S. Cl. .......................................... 307/140
(58) Field of Classification Search ............ 307/126, 307/128, 140
See application file for complete search history.

(56) References Cited

U.S. PATENT DOCUMENTS

| | | | | |
|---|---|---|---|---|
| 5,191,265 A | * | 3/1993 | D'Aleo et al. | 315/295 |
| 6,034,581 A | * | 3/2000 | DiMarco et al. | 335/16 |
| 6,269,838 B1 | * | 8/2001 | Woodworth et al. | 137/625.22 |
| 7,019,606 B2 | * | 3/2006 | Williams et al. | 335/20 |
| 7,453,678 B2 | * | 11/2008 | Beneditz et al. | 361/93.2 |

* cited by examiner

*Primary Examiner* — Robert L. Deberadinis
(74) *Attorney, Agent, or Firm* — Jose R. de la Rosa

(57) ABSTRACT

An electrical distribution system is provided for selectively connecting an electrical power source to load devices comprising a panelboard having a plurality of load circuit positions. A remote operated device is mountable in the panelboard comprising a load control device, and a device control for controlling the load control device. The device control comprises a programmed controller for operating the load control device responsive to control commands and a communication circuit for receiving control commands. An input/output (I/O) controller is mounted in the panelboard for controlling operation of the remote operated device, the I/O controller comprising a programmed controller for generating the control commands for commanding operation of the remote operated device, the control system including a communication circuit for communication with the remote operated device communication circuit.

20 Claims, 6 Drawing Sheets

INTERNAL INTELLIGENCE FOR REMOTE OPERATED RELAY

CROSS REFERENCE TO RELATED APPLICATIONS

This application claims priority of provisional application No. 60/826,643 filed Sep. 22, 2006, the contents of which is incorporated by reference herein.

FIELD OF THE INVENTION

This invention relates generally to residential and commercial electrical power distribution panels and components, and more particularly, to a remote operated device including internal intelligence in an electrical power distribution system.

BACKGROUND OF THE INVENTION

Circuit breaker panels are used to protect electrical circuitry from damage due to an overcurrent condition, such as an overload, a relatively high level short circuit, or a ground fault condition. To perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle.

In the overcurrent condition, all the pairs of separable contacts are disengaged or tripped, opening the electrical circuitry. When the overcurrent condition is no longer present, the circuit breaker can be reset such that all the pairs of separable contacts are engaged, closing the electrical circuitry.

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

Switchgear and switchboard are general terms used to refer to electrical equipment including metal enclosures that house switching and interrupting devices such as fuses, circuit breakers and relays, along with associated control, instrumentation and metering devices. The enclosures also typically include devices such as bus bars, inner connections and supporting structures (referred to generally herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein.

In addition to electrical distribution and the protection of circuitry from overcurrent conditions, components have been added to panels for the control of electrical power to loads connected to circuit breakers. For example, components have been used to control electrical power for lighting.

One system used for controlling electrical power to loads utilizes a remote-operated circuit breaker system. In such a system, the switch unit of the circuit breaker operates not only in response to an overcurrent condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel.

Operation of remote operated circuit breakers requires a means to receive command signals to open or close and report back successful operation or device status. Also required are means to drive opening and closing of switch mechanism contacts. To meet these requirements most efficiently, electronic circuitry is needed. Typically, this circuitry is external to the switching device, due to component size and amount of power required. Locating communication and driver circuitry outside the switching device necessitates the circuitry always being present in the panelboard even if the switching device is not.

The present invention relates to a remote operated device including internal intelligence in an electrical power distribution system.

SUMMARY OF THE INVENTION

In accordance with the invention there is provided a remote operated device including internal intelligence in an electrical power distribution system.

There is disclosed in accordance with one aspect of the invention a remote operated device for selectively distributing electrical power from an electrical power source to load circuits comprising a housing mountable in a distribution panel. A load control device is in the housing. A device control in the housing controls the load control device. The device control comprises a programmed controller for operating the load control device responsive to control commands and a communication circuit for receiving control commands from a remote controller.

It is a feature of the invention that the load control device comprises a relay.

It is another feature of the invention that the load control device comprises a breaker.

It is a further feature of the invention that the load control device comprises a current meter.

It is still another feature of the invention that the load control device comprises a dimmer.

It is yet another feature of the invention that the load control device comprises a magnetically held solenoid. A sensing devise may sense position of the magnetically held solenoid.

It is a feature of the invention that the programmed controller comprises a microcontroller and associated memory.

It is another feature of the invention that status indicators are provided in the housing.

It is still another feature of the invention that a programming port is operatively coupled to the programmed controller.

There is disclosed in accordance with another aspect of the invention an electrical distribution system for selectively connecting an electrical power source to load devices comprising a panelboard having a plurality of load circuit positions. A remote operated device is mountable in the panelboard comprising a load control device, and a device control for controlling the load control device. The device control comprises a programmed controller for operating the load control device responsive to control commands and a communication circuit for receiving control commands. An input/output (I/O) controller is mounted in the panelboard for controlling operation of the remote operated device, the I/O controller comprising a programmed controller for generating the control commands for commanding operation of the remote operated device, the control system including a communication circuit for communication with the remote operated device communication circuit.

Further features and advantages of the invention will be readily apparent from the specification and the drawings.

DETAILED DESCRIPTION OF THE INVENTION

An electrical distribution system, such as an integrated lighting control system, in accordance with the invention permits a user to control power circuits typically used for lighting, as well as circuits for resistive heating or air conditioning, using a remote operated device including internal intelligence. Control may include on/off switching, dimming and metering. The electrical distribution system may be as is generally described in U.S. application Ser. No. 11/519,727, filed Sep. 12, 2006, the specification of which is incorporated by reference herein.

Figure 1:
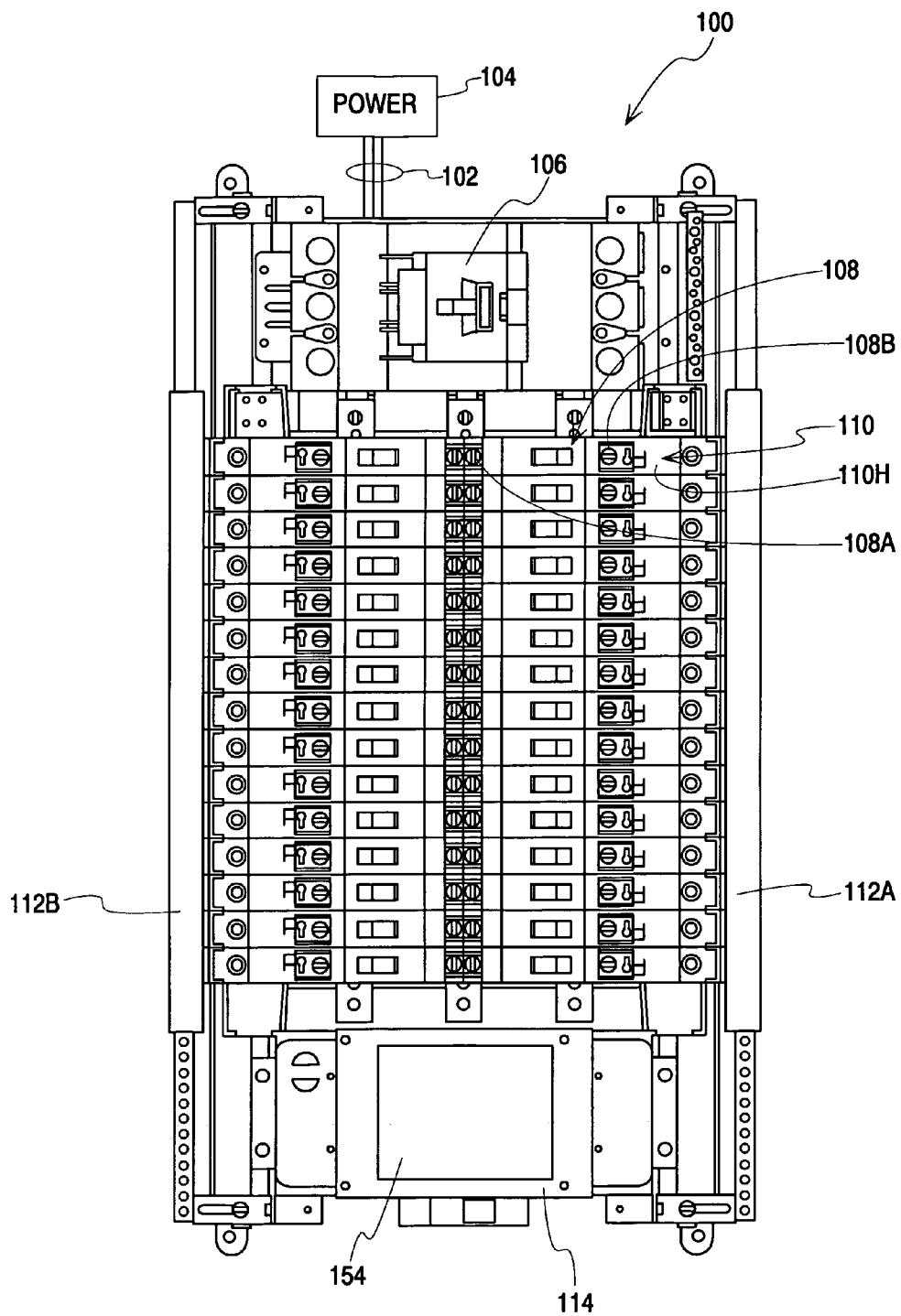
FIG. 1 is an elevation view of a power distribution panel according to the invention.

Referring to FIG. 1, a lighting control system in accordance with the invention comprises a lighting control panel 100. The panel 100 may comprise a Siemens type P1 panelboard, although the invention is not limited to such a configuration. Line power enters the panel 100 through power source cables 102 connected to a source of power 104. Line power may, for example, be a three phase 480Y277, 240 or 120 VAC power source, as is conventional. The cables 102 are electrically connected to an input side of a main breaker 106. The main breaker 106 distributes line power to individual circuit breakers 108 in a conventional manner. How the power is distributed depends on design of the individual circuit breakers 108, as will be apparent to those skilled in the art. The power is distributed to the line side of individual circuit breakers 108. The panel 100 may be configured to accept up to forty-two individual circuit breakers 108, although only thirty are shown in the embodiment of FIG. 1. Each circuit breaker may be of conventional construction and may be, for example, a Siemens BQD circuit breaker. Each circuit breaker 108 includes a line terminal 108A receiving power from the main breaker 106 and a load terminal 108B conventionally used for connecting to a load circuit.

For simplicity of description, when a device such as a circuit breaker 108 is described generally herein the device is referenced without any hyphenated suffix. Conversely, if a specific one of the devices is described it is referenced with a hyphenated suffix, such as 108-1.

In accordance with the invention, each load circuit to be controlled also has a remote operated device 110, such as a relay, a meter or a dimmer. The term remote operated device as used herein includes any other devices that controls, monitors or may otherwise be used in a load circuit, in accordance with the invention. While in a preferred embodiment, the remote operated device 110 is a separate component from the circuit breaker 108, the term "remote operated device" as used herein encompasses devices integral with the circuit breaker. The remote operated devices 110 are also connected to data rails 112A and 112B. A panel controller 114 controls the remote operated devices 110 through connections provided via the data rails 112A and 112B, as discussed below.

The remote operated device 110 includes a housing 110H encasing an auxiliary set of contacts that can be remotely operated to open and close a lighting circuit. The device 110 is attached to the load side of a circuit breaker 108 within a panel 100 using a conductor tab, i.e, the terminal 110A, inserted into the breaker lug 108B. The load terminal 110B comprises a lug of the same size as the breaker lug 108B for connecting to a wire to be connected to the load device. The device housing 110H is configured to mount in a Siemens type P1 panelboard, although the invention is not limited to such a configuration.

Figure 2:
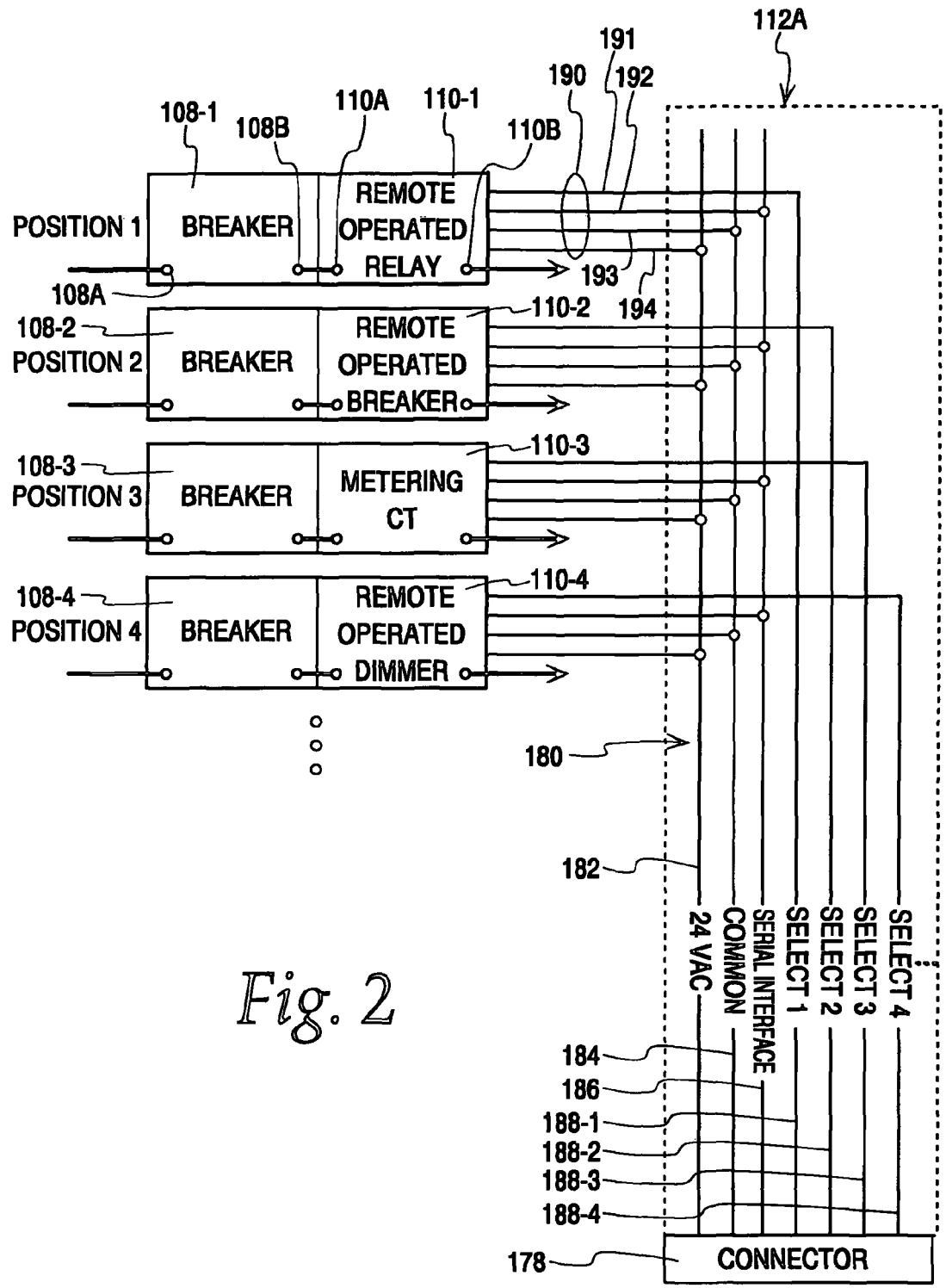
FIG. 2 is a block diagram illustrating pairs of circuit breakers and remote operated devices of the power distribution panel of FIG. 1.

Referring to FIG. 2, a block diagram illustrates four circuit breakers 108-1, 108-2, 108-3 and 108-4, and respective associated remote operated devices 110-1, 110-2, 110-3 and 110-4. In the illustrated embodiment, the first device 110-1 comprises a relay, the second device 110-2 comprises a breaker, the third device. 110-3 comprises a meter such as current transformer, and the fourth device 110-4 comprises a dimmer. As is apparent, any combination of these remote operated devices 110 could be used. Each remote operated device 110 includes an input terminal 110A electrically connected to the associated circuit breaker load terminal 108B, and an output terminal 110B for connection to a load device.

Figure 3:
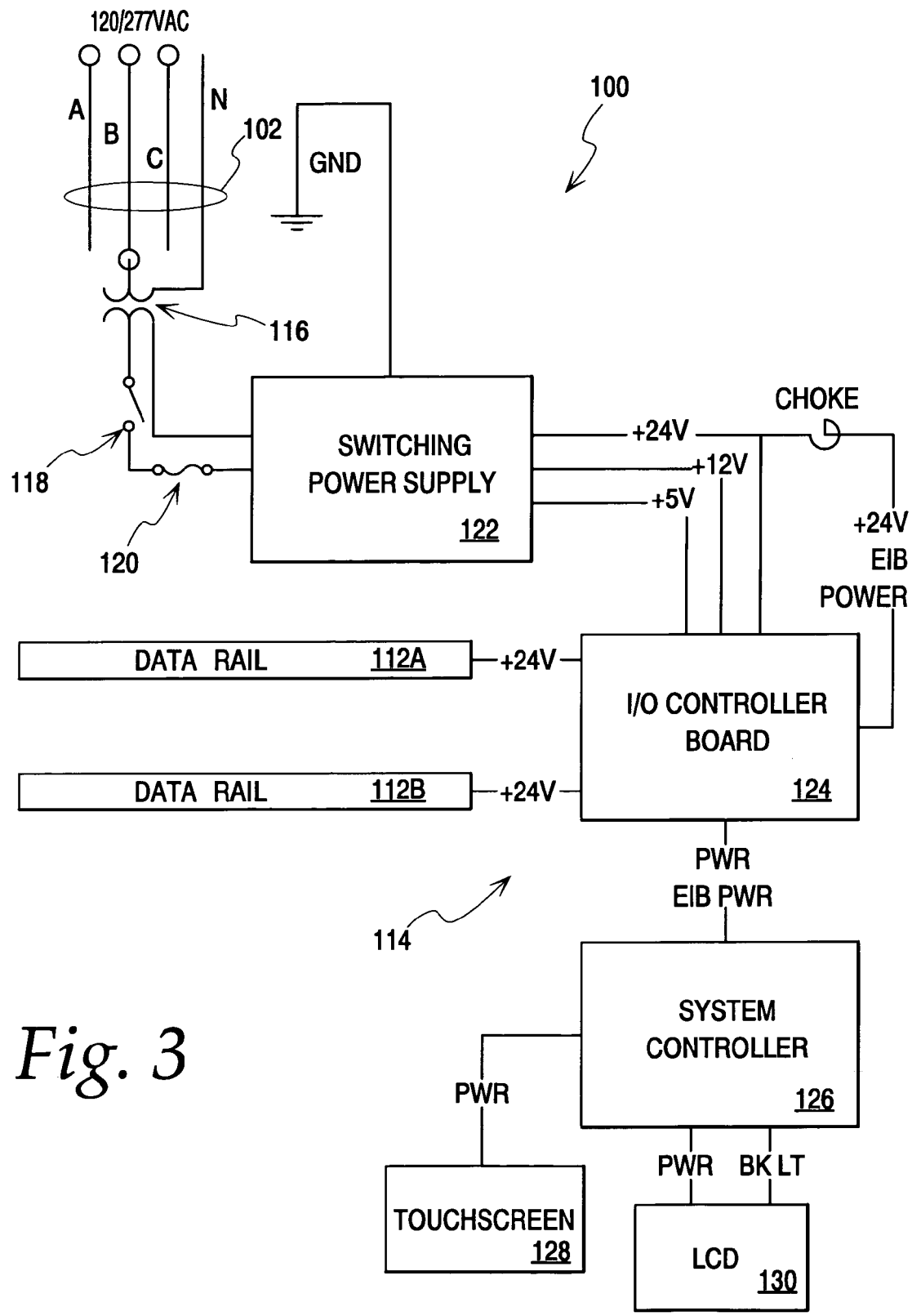
FIG. 3 is a block diagram of the power distribution panel of FIG. 1.

Referring to FIG. 3, a block diagram of the lighting control panel 100 is illustrated. Power from the lines 102 is provided via an isolation transformer 116, power switch 118 and fuse 120 to a switching power supply 122. The panel controller 114 comprises an input/output (I/O) controller 124 and optionally a system controller 126. The power supply 122 provides isolated power to all of the control components including the I/O controller 124, the system controller 126, and the remote operated devices 110, see FIG. 1, via the data rails 112A and 112B. The I/O controller 124 and system controller 126 each have DC-DC converters deriving regulated DC voltage levels as required from the main DC output of the power supply 122. The power supply 122 also provides 24 volts to the remote operated devices 110. The system controller 126 is operatively connected to a touch screen 128 and an LCD 130.

Figure 4:
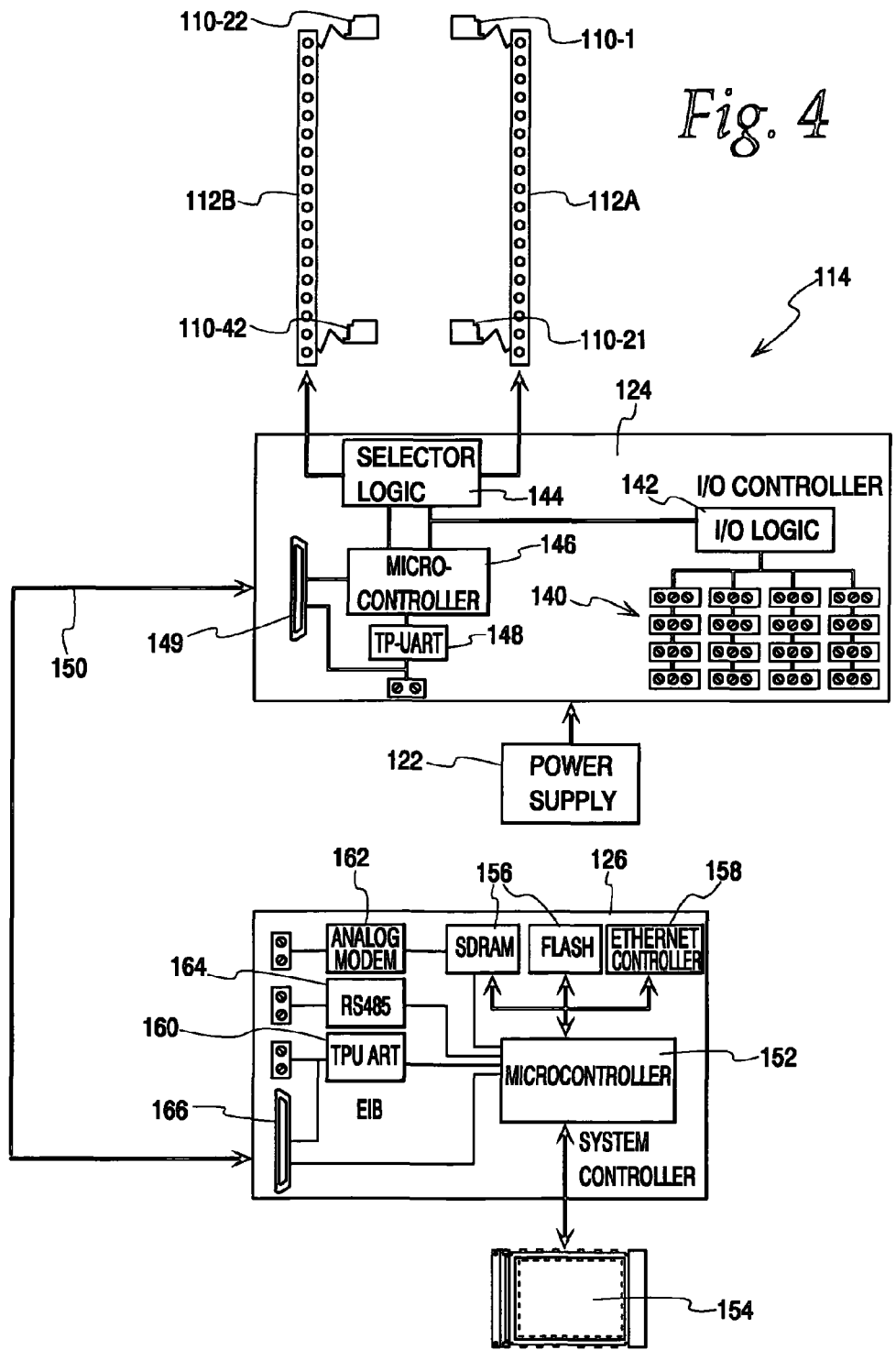
FIG. 4 is an expanded schematic/block diagram of the power distribution panel of FIG. 1.

In one embodiment of the invention, shown in FIG. 4, the panel controller 114 functions as a single panel stand alone system. The I/O controller 124 supplies power and control signals through the rails 11 2A and 112B to the remote operated devices, four of which, 110-1, 110-21, 110-22 and 110-42, are illustrated. A user interface and high level scheduling and control are provided by the system controller 126.

The I/O controller 124 provides discrete inputs to the controller 114 from dry contact switches, such as wall switches, (not shown) which can be connected to discrete input terminals 140. The terminals 140 are organized as two inputs and a common. The inputs to the terminals 140 are detected by dry contact I/O logic 142. A selector logic block 144 generates selector line signals and serial communications to the remote operated devices 110 via the data rails 112. The logic blocks 142 and 144 are operatively associated with a microprocessor or microcontroller 146. A TP-UART integrated circuit 148 provides an EIB (European Installation Bus) interface. A connector 149 allows mating directly to the system controller 126 via a cable 150.

The system controller 126 provides the user with an application to implement lighting schedules, organize devices into logical groups, manage the inputs, and obtain status information. The system controller 126 includes a microprocessor 152 operatively connected to a user interface 154 in the form of an integrated touch screen 128 and LCD 130, see FIG. 3. The microprocessor 152 is also connected to memory devices 156 and an ethernet controller 158. A TP-UART circuit 160 provides an EIB interface while additional interfaces are provided via an analog modem 162 and RS485 interface circuit 164. A connector 162 is provided for connection to the cable 150.

Referring again to FIG. 2, a data rail 112 is illustrated schematically. The data rail 112 is mechanically attached directly to the interior of the lighting control panel 100. The data rail 112 comprises a shielded communication bus including a ribbon connector 178 having twenty-five to twenty-nine wires to be routed to the I/O controller board 124. The ribbon connector 178 typically has twenty-six wires, two for power connection, two for ground connection, one for the serial line and up to twenty-one select lines, one for each remote operated device 110. Each data rail 112 provides a barrier to isolate the class 1 load wires from the class 2 signal wires used to manage the devices 110. The data rails 112 will connect to each device 110 via a connector that extends out of the device 110. The wires are connected to a printed circuit board 180 included traces defined as follows. A power trace 182 provides 24 volt DC power to each remote operated device 110. A common trace 184 provides a ground to each remote operated device 110. A serial interface trace 186 provides serial communication to each of the remote operated devices 110. A plurality of select line traces, four of which 188-1, 188-2, 188-3 and 188-4 are illustrated, are provided, one for each remote operated device 110. Each remote operated device 110 includes a four wire cable 190 for connection to the data rail 112. The four wires comprise a select line 191 connected to one of the select traces 188, a serial interface line 192 connected to the serial interface trace 186, a neutral wire 193 connected to the common trace 184 and a power wire 194 connected to the power trace 182.

In accordance with the invention, a unique select line is assigned to each breaker 108/remote operated device 110 pair positioned within the lighting control panel 100. Select lines are used by the 1/0 controller 124 to select single remote operated devices to communicate via the serial interface trace 186. For example, when the first select line 188-1 is asserted, the first remote operated device 110-1 listens for messages on the serial interface line 186. Conversely, messages on the serial interface 186 are ignored if the first select line 188-1 is not asserted. A response by any of the remote operated devices 110 to a serial command is therefore conditional on whether its particular select line is asserted. The term "asserted", as used herein, means one state of a signal designated to cause the remote operated device to listen for messages. In a preferred embodiment, the select line has "high" and "low" states, the high state being the asserted state.

The remote operated device 110, in the form of a relay, allows remote switching of an electrical branch load. The device 110 is designed to fit inside a standard electrical panel board with up to forty-two branch circuit breakers 108. The device 110 is an accessory to a branch circuit breaker 108 allowing repetitive switching of the load without effecting operation of the circuit breaker 108.

The remote operator device 110 requires a means to receive command signals to open or close and to report back successful operation or device status. Also required is a means to drive opening and closing of the switch mechanism contacts. In accordance with the invention, the remote operator device use a magnetically held solenoid as an actuator device and an internal electronic circuit board. With this design, electronic control circuitry is located inside the switching device itself. The use of a magnetically held solenoid or "mag latch" as a switching actuator results in very low energy requirements, requires short duration pulses to change position (measured in milliseconds), provides accurate and repeatable timing and requires that the control must reverse voltage polarity.

Figure 5:
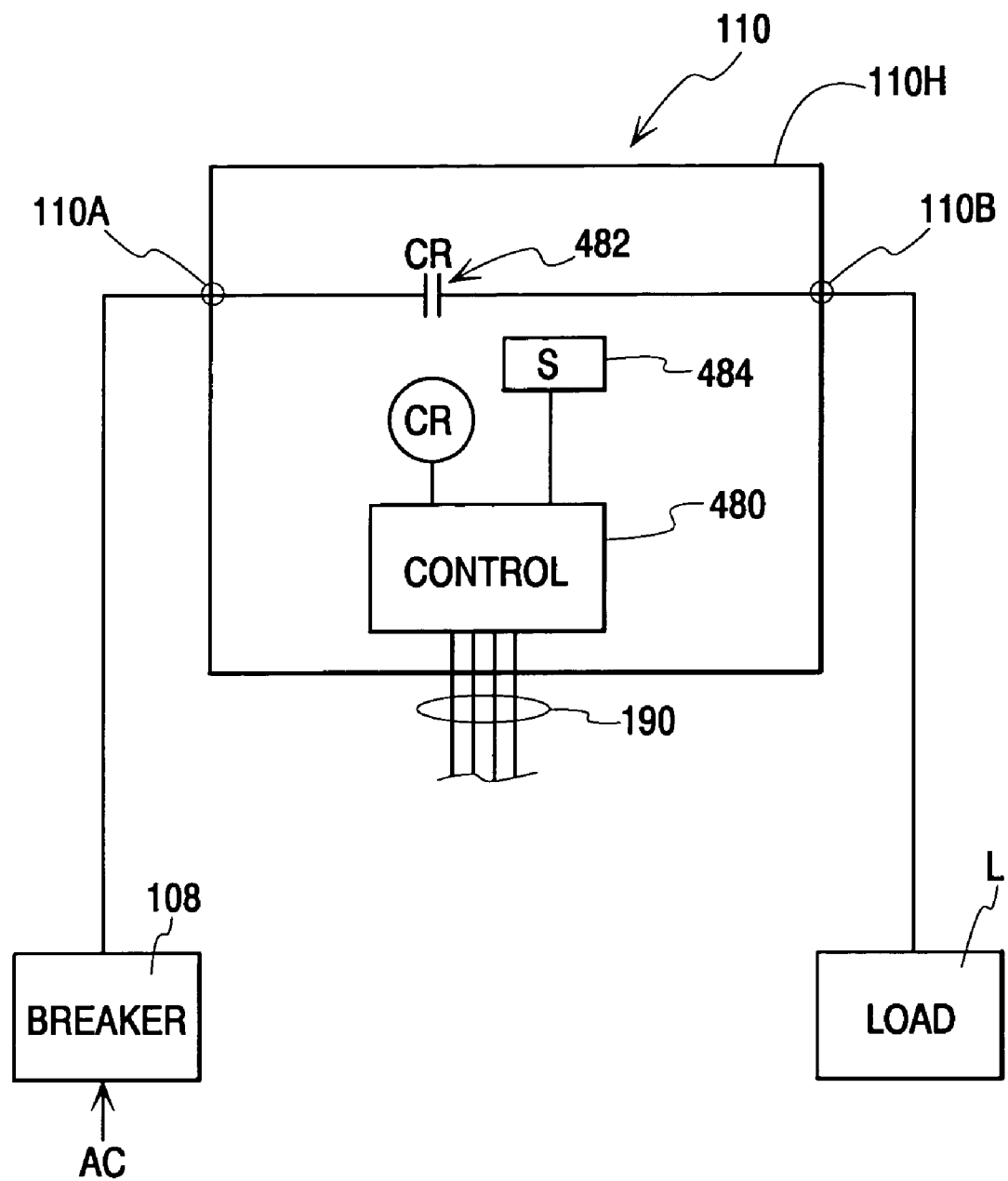
FIG. 5 is a basic block diagram of a remote operated relay in accordance with the invention.

FIG. 5 illustrates a basic block diagram for load switching. The remote operated device 110, in the form of a relay, includes a control circuit 480 connected to the cable 190. The control circuit 480 drives a control relay CR having a normally open contact 482 connected between terminals 110A and 110B. A sensor 484 senses status of the relay CR and is connected to the control circuit 480. As such, the control circuit 480 controls operation of the contact 482 to selectively electrically connect a load L to the breaker 108, and thus to power the load L.

The control circuit 480 comprises a conventional microcontroller and associated memory, the memory storing software to run in the control circuit 480 in accordance with commands received from the I/O controller 124.

Figure 6:
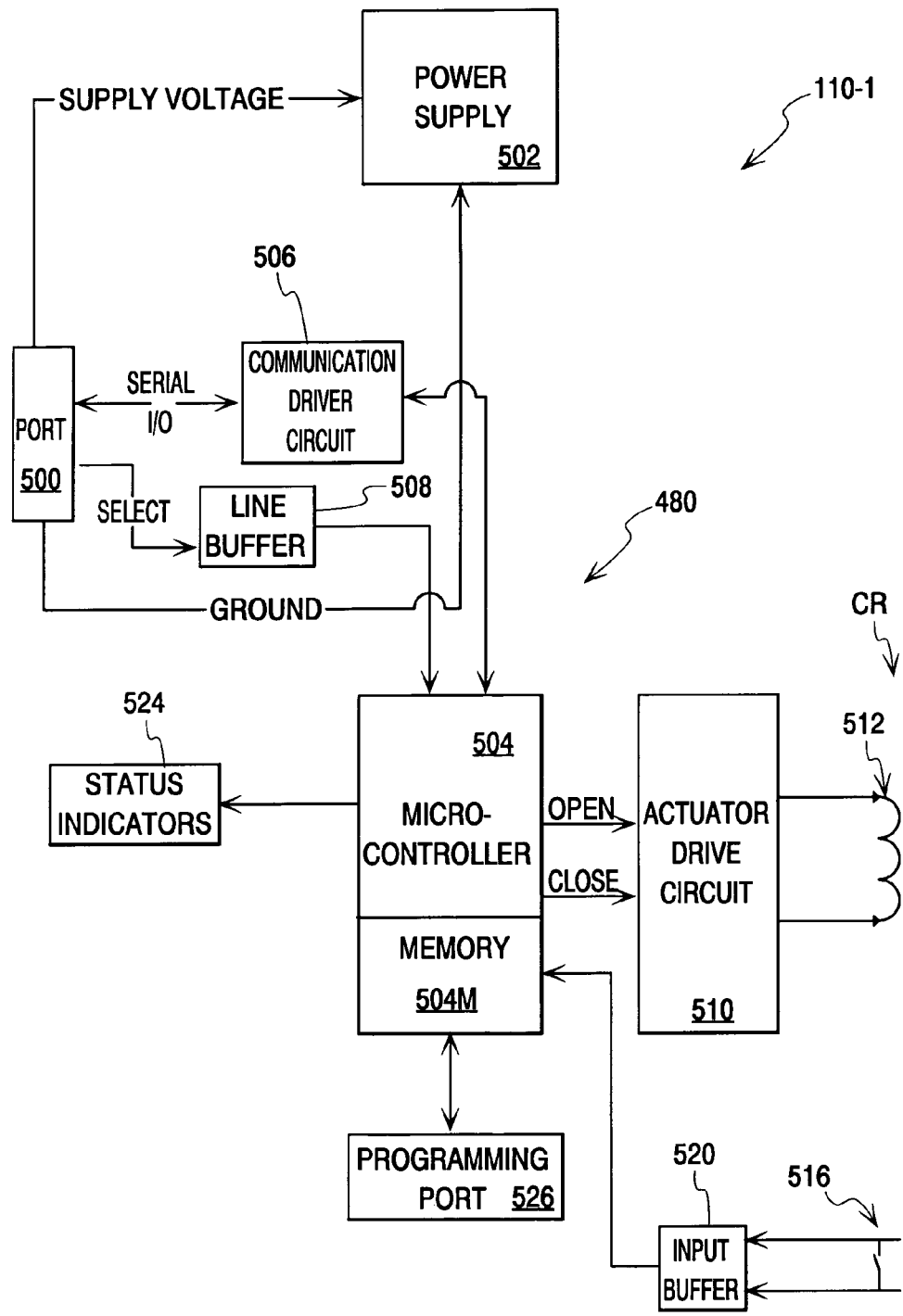
FIG. 6 is a detailed block diagram of the remote operated relay of FIG. 5.

FIG. 6 illustrates a detailed block diagram of the remote operated device in the form of a relay 110-1, and particularly the control circuit 480. Connection to the data rail 112 is through a four wire port 500. The port 500 includes a positive supply voltage and ground, a serial communication line, and a select line, as discussed above. The supply voltage and ground are fed to a power supply 502 to generate voltages needed for a microcontroller 504 and other circuits. A communication driver circuit 506 is used to isolate and drive a single wire serial communication line between the microcontroller 504 and the port 500 and thus the data rail 112. As discussed above, the single wire connection to each remote operated device 110 and to the I/O controller 124 is used to transmit and receive commands and data. This provides necessary isolation and protection. In the event of an individual device failure, the remainder of the devices continue to operate properly. The select line from the port 500 is buffered in a line buffer 508 and connected to the microcontroller 504. This select line is used to enable or disable communications to and from the remote operated device 110. By selecting more than one remote operated device, the I/O controller 124 can send commands or messages to multiple devices 110 at the same time, reducing traffic on the serial communication bus.

The microcontroller 504 comprises a conventional microcontroller and associated memory 504M, the memory storing software to run in the microcontroller 504.

The microcontroller 504 has OPEN and CLOSE lines to an actuator drive circuit 510. The control relay CR in the illustrated embodiment of the invention comprises an actuator coil 512 connected to the actuator drive circuit 510. The actuator drive circuit 510 provides current to drive the coil 512. An OPEN signal causes the drive circuit 510 to apply negative voltage to the actuator coil 512 for a short period of time (about 10 to 30 milliseconds). This causes the actuator plunger to pull-in and become magnetically latched or held in the open position to open the contact 482, see FIG. 5. Power is then removed from the coil 512. A CLOSE signal from the microcontroller 504 causes the drive circuit 510 to apply a positive voltage to the actuator coil 512 for a shorter period of time (about 2 to 3 milliseconds). This period of time is sufficient for the actuator plunger (not shown) to become unlatched or released and springs force it to the closed position to close the contact 482, see FIG. 5. Again, power is then removed from the coil 512. Since the actuator is stable in both the open and closed positions, energy is only required to change position. This results in low energy solution. Also included in the actuator drive circuit 510 is protection from both open and closed signals applied at the same time, which could result in a short circuit of the power supply 502.

Feedback for actuator plunger position is provided by the sensor 484 in the form of an auxiliary position switch 516. The signal is buffered in an input buffer 520 and then connected to the microcontroller 504. The microcontroller 504 uses the feedback information to respond to an I/O controller request for status or to retry a failed open or close attempt.

Additionally, the microcontroller 504 can send signals to various types of status indicators 524 such as LEDs to show open, closed, communications OK, operating properly, low voltage, etc. A programming port 526 can be used to program or update the microcontroller software or to load parameters such as on/off pulse rates or to troubleshoot the device 110.

The software implemented in the remote operator device microcontroller 504 includes various routines. This includes a start up routine executed when the microcontroller 504 resets. It reads any data that has been stored in flash memory that needs to be modified during operations into ram variables. It turns out interrupts and otherwise initialize microcontroller operations and jumps into the status loop function.

The status loop function has several objectives. One is to keep the status data up to date to respond to status requests. Another is to run the state machine for the device, such as managing pulse widths and sequencing retry.

Pulse widths for open and close are not the same. Also, the pulse width for the open operation is not always the same, it increases by temperature/age/number of times close. An open contacts function will set up the sequencer for an open operation placing a start open pulse task and a stop open pulse task into a sequence or queue. The open command is always executed, regardless of the detected position of the contact, to overcome any failures in detecting the position of the contact. A close contacts function sets up a sequencer for a close operation replacing a start close pulse task and a stop close pulse task into the sequencer queue. The close command will always be executed, regardless of the detected position, to overcome any failures in detecting the position of the contact.

A communications handler function runs communications protocol over the serial line. The functions include decode command, open, close, send status and send report. A report operation function assembles the data required to respond to a report operation command received on the serial line.

Communications from the I/O controller 124 to the remote operated device 110 will be master-slave, with the I/O controller 124 being the master and the devices 110 the slaves. Once the I/O controller application sends an open or closed command, it will not wait for a response from the device 110. Rather, it hands over to the I/O sequencer queue, to perform a status check at a later time. This allows some time for the device 110 to settle down with its new status.

As is apparent, the remote operated breaker 110-2, remoter operated meter, such as a current transformer, 110-3 and remote operated dimmer 110-4, see FIG. 2, include similar circuitry to the relay 110-1, except that the relay components are replaced by components required for the particular device application.

Thus in accordance with the invention there is provided a remote operated device including internal intelligence in an electrical power distribution system.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

I claim:

1. A remote operated device for use in an electrical distribution panel receiving electrical power from a power source and providing the electrical power to each of a plurality of load circuit positions for selectively distributing electrical power from the electrical power source to load circuits comprising:
   a housing mountable in one of the load circuit positions of the distribution panel;
   a load control device in the housing, comprising a first terminal for receiving electrical power, a second terminal for connection to a load device and a controllable switch electrically connecting the first and second terminals; and
   a device control in the housing for controlling the controllable switch of the load control device to selectively connect the load device to the power source, the device control comprising a programmed controller for operating the load control device responsive to control commands and a communication circuit for receiving control commands from a remote controller.

2. The remote operated device of claim 1 wherein the load control device comprises a relay.

3. The remote operated device of claim 1 wherein the load control device comprises a breaker.

4. The remote operated device of claim 1 wherein the load control device comprises a current meter.

5. The remote operated device of claim 1 wherein the load control device comprises a dimmer.

6. The remote operated device of claim 1 wherein the load control device comprises a magnetically held solenoid.

7. The remote operated device of claim 6 further comprising a sensing device for sensing position of the magnetically held solenoid.

8. The remote operated device of claim 1 wherein the programmed controller comprises a microcontroller and associated memory.

9. The remote operated device of claim 1 further comprising status indicators in the housing.

10. The remote operated device of claim 1 further comprising a programming port operatively coupled to the programmed controller.

11. An electrical distribution system for selectively connecting an electrical power source to load devices, comprising:
   a panelboard having a plurality of load circuit positions;
   a remote operated device mountable in the panelboard comprising a load control device, and a device control for controlling the load control device, the device control comprising a programmed controller for operating the load control device responsive to control commands and a communication circuit for receiving control commands;
   an input/output (I/O) controller mounted in the panelboard for controlling operation of the remote operated device, the I/O controller comprising a programmed controller for generating the control commands for commanding operation of the remote operated device, the control system including a communication circuit for communication with the remote operated device communication circuit; and
   a data rail mounted to the panelboard, the data rail being electrically connected to the I/O controller communication circuit and selectively connected to the remote operated device communication circuit incident to the remote operated device being mounted in the panelboard.

12. The electrical distribution system of claim 11 wherein the load control device comprises a relay.

13. The electrical distribution system of claim 11 wherein the load control device comprises a breaker.

14. The electrical distribution system of claim 11 wherein the load control device comprises a current meter.

15. The electrical distribution system of claim 11 wherein the load control device comprises a dimmer.

16. The electrical distribution system of claim 11 wherein the load control device comprises a magnetically held solenoid.

17. The electrical distribution system of claim 16 further comprising a sensing device for sensing position of the magnetically held solenoid.

18. The electrical distribution system of claim 11 wherein the programmed controller comprises a microcontroller and associated memory.

19. The electrical distribution system of claim 11 further comprising status indicators in the housing.

20. The electrical distribution system of claim 11 further comprising a programming port operatively coupled to the programmed controller.

* * * * *